United States Patent
Komatsu et al.

(10) Patent No.: US 11,360,201 B2
(45) Date of Patent: Jun. 14, 2022

(54) DEVICE FOR ESTIMATING SPEED OF MOVING SOUND SOURCE, SPEED MONITORING SYSTEM, METHOD FOR ESTIMATING SPEED OF MOVING SOUND SOURCE, AND STORAGE MEDIUM IN WHICH PROGRAM FOR ESTIMATING SPEED OF MOVING SOUND SOURCE IS STORED

(71) Applicant: NEC Corporation, Tokyo (JP)

(72) Inventors: Tatsuya Komatsu, Tokyo (JP); Yuzo Senda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 685 days.

(21) Appl. No.: 16/329,803

(22) PCT Filed: Sep. 5, 2017

(86) PCT No.: PCT/JP2017/031897
§ 371 (c)(1),
(2) Date: Mar. 1, 2019

(87) PCT Pub. No.: WO2018/047805
PCT Pub. Date: Mar. 15, 2018

(65) Prior Publication Data
US 2019/0219679 A1    Jul. 18, 2019

(30) Foreign Application Priority Data
Sep. 9, 2016  (JP) .............................. JP2016-176167

(51) Int. Cl.
*G01S 11/00*    (2006.01)
*G01S 11/14*    (2006.01)
(Continued)

(52) U.S. Cl.
CPC ................ *G01S 11/14* (2013.01); *G08G 1/01* (2013.01); *G08G 1/052* (2013.01)

(58) Field of Classification Search
CPC .......... G01S 11/14; G08G 1/01; G08G 1/052; G08G 1/116; G08G 1/0129; G08G 1/0133; G08G 1/04
See application file for complete search history.

(56) References Cited

U.S. PATENT DOCUMENTS 4,558,439 A * 12/1985 Gu/ desen .............. G01V 1/001
367/136
9,229,087 B1 * 1/2016 Rossiter ................ G01S 5/0009
(Continued)

FOREIGN PATENT DOCUMENTS

EP   1108994 A2 *  6/2001   .......... G01S 3/8086
JP   H05-114098 A    5/1993
(Continued)

OTHER PUBLICATIONS

Doi et al., "Identification of noise generation sources on a high-speed moving object—A position estimating method using Doppler effect-", Proceedings of Presentations at Research Conference of Acoustic Society of Japan, Acoustic Society of Japan, 1997, No. 2, pp. 663 to 664, 2 pages total.
(Continued)

*Primary Examiner* — Ojiako K Nwugo
(74) *Attorney, Agent, or Firm* — Sughrue Mion, PLLC

(57) ABSTRACT

A sound signal corresponding to a sound emitted by a sound source is inputted to a frequency analysis unit (101), and the frequency analysis unit (101) performs frequency analysis of the sound signal and generates a spectrogram. Spectrogram template information indicating spectrograms corresponding to each of at least a plurality of predetermined movement speeds, the spectrograms being for cases in which the sound source is moved, is stored in a model storage unit (102). An
(Continued)

estimation unit (103) estimates the movement speed of the sound source on the basis of the spectrogram generated by the frequency analysis unit (101) and the plurality of spectrograms indicated by the spectrogram template information stored in the model storage unit (102).

8 Claims, 11 Drawing Sheets

(51) Int. Cl.
*G08G 1/01* (2006.01)
*G08G 1/052* (2006.01)

(56) References Cited

U.S. PATENT DOCUMENTS

| | | | | |
|---|---|---|---|---|
| 2005/0177372 | A1* | 8/2005 | Wang | G06K 9/00536 |
| | | | | 704/E15.015 |
| 2010/0303254 | A1* | 12/2010 | Yoshizawa | G01S 3/8083 |
| | | | | 381/92 |
| 2011/0227782 | A1* | 9/2011 | Tseng | G01S 7/415 |
| | | | | 342/115 |
| 2012/0098704 | A1* | 4/2012 | Arnoult, Jr. | G01S 5/0294 |
| | | | | 342/418 |
| 2012/0323532 | A1* | 12/2012 | Yoshioka | G08G 1/166 |
| | | | | 702/189 |
| 2014/0049420 | A1* | 2/2014 | Lehning | G08G 1/015 |
| | | | | 342/109 |
| 2014/0205110 | A1* | 7/2014 | Hera | G10K 15/02 |
| | | | | 381/86 |
| 2014/0278206 | A1* | 9/2014 | Girod | G01C 21/165 |
| | | | | 702/141 |
| 2017/0193975 | A1* | 7/2017 | Butts | G10K 11/17854 |
| 2017/0261469 | A1* | 9/2017 | Chang | G01V 3/28 |

FOREIGN PATENT DOCUMENTS

| | | |
|---|---|---|
| JP | H05-115098 A | 5/1993 |
| JP | 2000-329838 A | 11/2000 |
| JP | 2003-272089 A | 9/2003 |
| JP | 2004-191180 A | 7/2004 |
| JP | 2007-026300 A | 2/2007 |
| JP | 2012-145461 A | 8/2012 |
| WO | 2013/140747 A1 | 9/2013 |

OTHER PUBLICATIONS

International Search Report dated Dec. 12, 2017 issued by the International Searching Authority in International application No. PCT/JP2017/031897.

Written Opinion dated Dec. 12, 2017 issued by the International Searching Authority in International Partial application No. PCT/JP2017/031897.

Japanese Office Action for JP Application No. 2018-538415 dated Jan. 26, 2021 with English Translation.

* cited by examiner

DEVICE FOR ESTIMATING SPEED OF MOVING SOUND SOURCE, SPEED MONITORING SYSTEM, METHOD FOR ESTIMATING SPEED OF MOVING SOUND SOURCE, AND STORAGE MEDIUM IN WHICH PROGRAM FOR ESTIMATING SPEED OF MOVING SOUND SOURCE IS STORED

This application is a National Stage Entry of PCT/JP2017/031897 filed on Sep. 5, 2017, which claims priority from Japanese Patent Application 2016-176167 filed on Sep. 9, 2016, the contents of all of which are incorporated herein by reference, in their entirety.

TECHNICAL FIELD

The present invention relates to a speed estimation device for a moving sound source, a speed monitoring system, a speed estimation method for a moving sound source, and a speed estimation program for a moving sound source, which are capable of estimating a speed of a moving sound source.

BACKGROUND ART

There is a method for estimating a movement speed of a sound source, based on sound emitted from the sound source and input to a microphone.

In a method described in NPL 1, when a sound source is moving, a movement speed of the sound source is estimated by using occurrence of a frequency difference due to the Doppler effect between a frequency of sound emitted from the sound source and a frequency of sound observed at a sound receiving position. In other words, the method described in NPL 1 uses a temporal change of a frequency of sound observed according to a movement speed of a sound source.

Specifically, in the method, a frequency analysis is performed on observed sound, and a peak frequency being a frequency having a maximum amplitude among frequency components of the sound is picked up. Then, a movement speed is estimated by using a known relational expression between a change of frequency due to the Doppler effect and a movement speed, based on a temporal change of the picked peak frequency.

CITATION LIST

Non Patent Literature

[NPL 1] DOI, HIROE, KAKU, "Identification of noise generation sources on a high-speed moving object—A position estimating method using Doppler effect—", Proceedings of Presentations at Research Conference of Acoustic Society of Japan, Acoustic Society of Japan, 1997, No. 2, pp. 663 to 664

SUMMARY OF INVENTION

Technical Problem

However, the method described in NPL 1 cannot appropriately calculate a peak frequency when a value of a signal to noise ratio (SNR) is small or sound has an unclear peak frequency, and thus cannot accurately estimate a speed of a moving sound source. Note that an example of sound having an unclear peak frequency includes sound having a frequency component over a wide band, such as traveling sound of an automobile.

An object of the present invention is to provide a speed estimation device for a moving sound source, a speed monitoring system, a speed estimation method for a moving sound source, and a speed estimation program for a moving sound source, which are capable of solving the above-mentioned problem and appropriately estimating a speed of a moving sound source, based on sound that has an unclear peak frequency.

Solution to Problem

A speed estimation device for a moving sound source, according to the present invention, includes: model storage means for storing spectrogram template information indicating a spectrogram at least according to each of a plurality of predetermined movement speeds, the spectrogram being in a case where a sound source is moved; frequency analysis means for receiving an input of a sound signal according to sound emitted from the sound source, performing a frequency analysis on the sound signal, and generating a spectrogram; and estimation means for estimating a movement speed of the sound source, based on the plurality of spectrograms indicated by the spectrogram template information stored in the model storage means, and the spectrogram generated by the frequency analysis means.

A speed monitoring system, according to the present invention, includes: a plurality of the speed estimation devices for a moving sound source; and abnormality detection means for outputting information indicating occurrence of an abnormal situation when a value of a movement speed of an estimation result by the estimation means falls outside a predetermined range.

A speed estimation method for a moving sound source, according to the present invention, includes: receiving an input of a sound signal according to sound emitted from a sound source, performing a frequency analysis on the sound signal, and generating a spectrogram; and estimating a movement speed of the sound source that emits sound according to the sound signal being input, based on a plurality of spectrograms at least according to each of a plurality of predetermined movement speeds, and a generated spectrogram, the spectrogram being in a case where the sound source is moved.

A speed estimation program for a moving sound source, according to the present invention, causes a computer to execute: frequency analysis processing of receiving an input of a sound signal according to sound emitted from a sound source, performing a frequency analysis on the sound signal, and generating a spectrogram; and estimation processing of estimating a movement speed of the sound source that emits sound according to the sound signal being input, based on a plurality of spectrograms at least according to each of a plurality of predetermined movement speeds, and the spectrogram generated by the frequency analysis processing, the spectrogram being in a case where the sound source is moved.

Advantageous Effects of Invention

According to the present invention, a speed of a moving sound source can be estimated appropriately, based on sound that has an unclear peak frequency.

EXAMPLE EMBODIMENT

Example Embodiment 1

Figure 1:
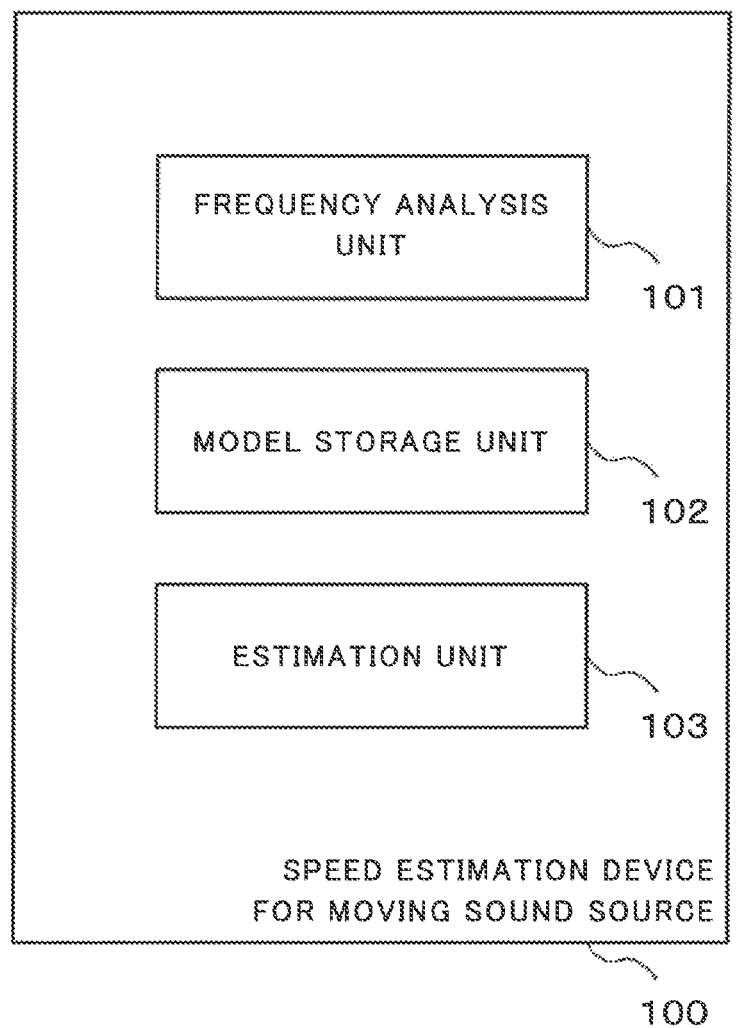
FIG. 1 is a block diagram illustrating a configuration example of a speed estimation device for a moving sound source in a first example embodiment.

A speed estimation device 100 for a moving sound source in a first example embodiment is described with reference to a drawing. FIG. 1 is a block diagram illustrating a configuration example of the speed estimation device 100 for a moving sound source in the first example embodiment.

As illustrated in FIG. 1, the speed estimation device 100 for a moving sound source includes a frequency analysis unit 101, a model storage unit 102, and an estimation unit 103.

The frequency analysis unit 101 receives an input of a sound signal according to sound emitted from a sound source, performs a frequency analysis on the sound signal, and generates a spectrogram.

The model storage unit 102 stores spectrogram template information indicating spectrograms at least according to each of a plurality of predetermined movement speeds, the spectrograms being in a case where a sound source is moved.

The estimation unit 103 estimates a movement speed of the sound source, based on the spectrogram generated by the frequency analysis unit 101 and the plurality of spectrograms indicated by the spectrogram template information stored in the model storage unit 102.

According to the present example embodiment, a temporal change of sound emitted from a sound source is identified as a change in the entire frequency structure by a frequency spectrogram, and thus deterioration of performance due to disturbance can be suppressed further than that by a method for identifying a temporal change of only a peak frequency. Therefore, according to the present example embodiment, a movement speed of a sound source can be estimated more accurately and appropriately, the sound source emitting sound that has an unclear peak frequency.

Example Embodiment 2

Figure 2:
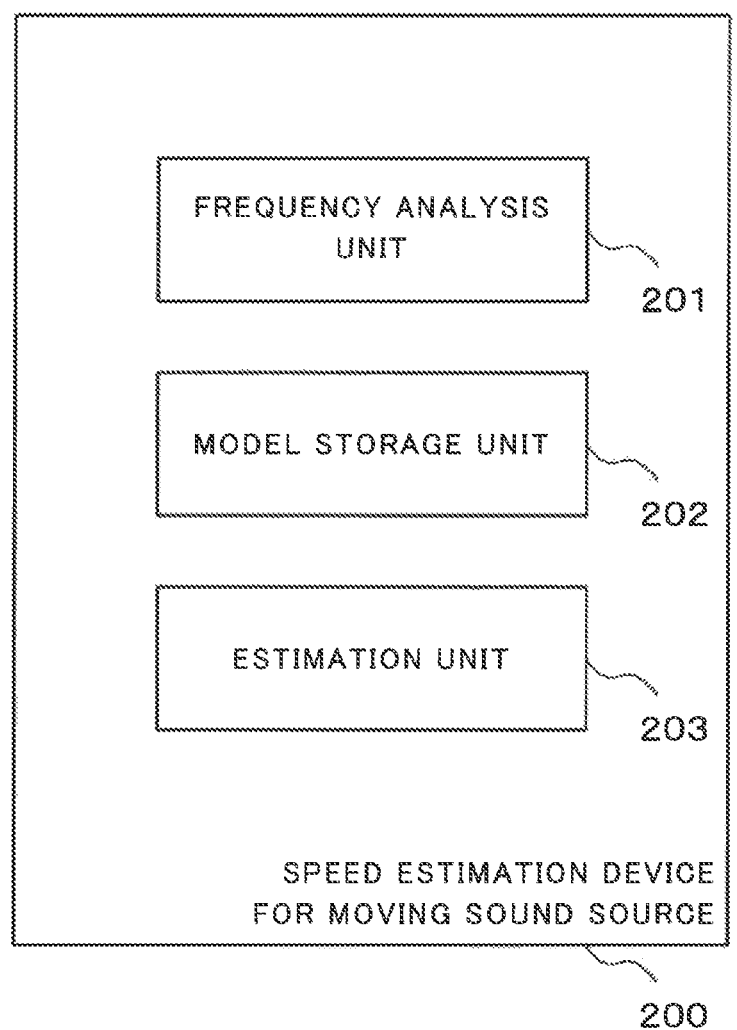
FIG. 2 is a block diagram illustrating a configuration example of a speed estimation device for a moving sound source in a second example embodiment.

A speed estimation device 200 for a moving sound source in a second example embodiment is described with reference to drawings. FIG. 2 is a block diagram illustrating a configuration example of the speed estimation device 200 for a moving sound source in the second example embodiment. The speed estimation device 200 for a moving sound source calculates, based on a change in an input sound signal, a movement speed of a sound generation source (also referred to as a sound source) associated with the sound signal. As illustrated in FIG. 2, the speed estimation device 200 for a moving sound source in the second example embodiment includes a frequency analysis unit 201, a model storage unit 202, and an estimation unit 203. Note that the frequency analysis unit 201 and the estimation unit 203 are achieved by, for example, a central processing unit (CPU) that executes processing according to program control and a plurality of circuits. Further, the model storage unit 202 is achieved by, for example, a storage means such as a hard disk and a memory.

The frequency analysis unit 201 performs a frequency analysis on an input sound signal, and calculates a frequency spectrogram. Note that the sound signal is generated by, for example, converting sound input to a microphone (not illustrated) to an electric signal, and is input to the frequency analysis unit 201.

Speed information and frequency spectrogram template information are stored in the model storage unit 202. Note that the speed information is, for example, information indicating each of a plurality of movement speeds assumed for a sound source associated with a sound signal input to the speed estimation device 200 for a moving sound source. Specifically, for example, the speed information is information indicating each of speeds (movement speeds) having a value of 0 in the ones place digit among values between 10 km/h to 180 km/h.

Further, the frequency spectrogram template information is, for example, information indicating, by a frequency spectrogram in a frame according to each movement speed, each temporal change of a frequency pattern of a sound signal observed when a sound source is moved at each movement speed indicated by the speed information. Specifically, for example, the frequency spectrogram template information includes a frequency spectrogram in a frame according to 10 km/h and a frequency spectrogram in a frame according to 120 km/h.

The estimation unit 203 estimates a movement speed of the sound source, based on the frequency spectrogram calculated by the frequency analysis unit 201 and the speed information and the frequency spectrogram template information stored in the model storage unit 202.

Each unit is described in more detail.

The frequency analysis unit 201 calculates a frequency spectrogram $X(k, l)$ when a sound signal $x(t)$ is input. Herein, t is a variable representing time in the sound signal $x(t)$. In the frequency spectrogram $X(k, l)$, k represents the number of frequency bins, and l represents the number of time frames. Then, the frequency spectrogram $X(k, l)$ is a k×l matrix in which strength numeric data about a frequency spectrogram with k as the number of frequency bins and l as the number of time frames are an element.

Further, x(t) may be a digital signal obtained by performing A-D (analog to digital) conversion on an analog signal obtained by converting input sound to an electric signal by a microphone and the like, for example.

In order to calculate the frequency spectrogram X(k, l), the frequency analysis unit 201 may perform processing in a filter bank of a frequency after processing of short-time Fourier transformation is performed on x(t), or may perform processing of wavelet transformation and constant-Q wavelet transformation on x(t), for example.

Note that the number l of time frames is, for example, the number of frames within a predetermined time width (for example, within one second before and after a sound source approaches closest to a microphone. It may be longer or shorter than one second).

The model storage unit 202 stores, as the frequency spectrogram template information, a frequency spectrogram template Y_v(k, l, f_s) of sound emitted from a sound source moving at a speed v while emitting sound at a frequency f_s. Specifically, the frequency spectrogram template Y_v(k, l, f_s) stored in the model storage unit 202 is, for example, the frequency spectrogram template Y_v(k, l, f_s) indicating a change in frequency by the Doppler effect within a predetermined time width (for example, two seconds. It may be longer or shorter than two seconds.) of sound emitted from a sound source moving at each speed v while emitting sound at a frequency f_s, taken as a template.

Assuming that a sound speed is c, a movement speed of a sound source is v, and a frequency of sound emitted from the sound source (also referred to as a sound source frequency) is f0 herein, a frequency f1 of sound recorded by a microphone and the like (also referred to as a recorded frequency) is expressed by an equation (1) indicated below, based on the Doppler effect.

$$f1 = (c/(c-v)) \times f0 \quad (1)$$

In the equation (1), a value of the recorded frequency f1 is expressed by a product of the sound source frequency f0 and c/(c−v). Therefore, a degree of change in the recorded frequency f1 varies depending on a value of the sound source frequency f0.

For example, when the sound speed c is 330 m/s and the movement speed v of the sound source is 30 m/s, the recorded frequency f1 is calculated from $$f1 = 1.1 \times f0 \quad (2)$$

by substituting the value of c and the value of v in the equation (1).

Therefore, the recorded frequency f1 when the sound source frequency f0 is 1000 Hz is calculated to be 1100 Hz. Thus, the recorded frequency f1 is changed by 100 Hz from the sound source frequency f0. Further, the recorded frequency f1 when the sound source frequency f0 is 2000 Hz is calculated to be 2200 Hz. Thus, the recorded frequency f1 is changed by 200 Hz from the sound source frequency f0. It is clear from these results that a degree of change in the recorded frequency f1 varies depending on a value of the sound source frequency f0. Therefore, a frequency spectrogram template needs to be prepared for each sound source frequency in order to accurately estimate a movement speed of the sound source. Thus, the frequency spectrogram template Y_v(k, l, f_s) according to the sound source frequency f_s (f_s is a frequency at intervals of 100 Hz between 100 Hz and 20000 Hz, for example) is stored in the model storage unit 202.

The estimation unit 203 estimates the movement speed v of the sound source, based on the frequency spectrogram X(k, l) and the frequency spectrogram template Y_v(k, l, f_s). Specifically, the estimation unit 203 first calculates a degree of similarity Z_v between the frequency spectrogram X(k, l) and the frequency spectrogram template Y_v(k, l, f_s) by using an equation (3) below.

$$\text{Degree of similarity } Z\_v = \max_{f\_s} \Sigma_k \Sigma_l \{X(k,l) \times Y\_v(k,l, f\_s)\} \quad (3)$$

Note that the estimation unit 203 determines a value of v as an estimation result of the movement speed v of the sound source when a value of the degree of similarity Z_v is maximum by changing the sound source frequency f_s. In other words, the estimation unit 203 calculates the degree of similarity Z_v while shifting a sound source frequency f, and determines a value of v as an estimation result of the movement speed v of the sound source when a value of the calculation result is maximum.

Figure 3:
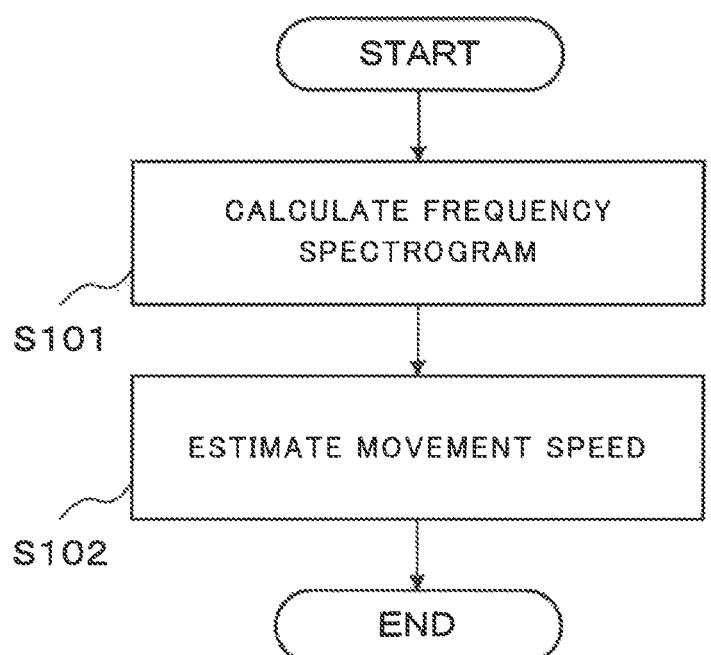
FIG. 3 is a flowchart illustrating an operation of the speed estimation device for a moving sound source in the second example embodiment.

Next, an operation of the speed estimation device 200 for a moving sound source in the second example embodiment is described. FIG. 3 is a flowchart illustrating the operation of the speed estimation device 200 for a moving sound source in the second example embodiment.

As illustrated in FIG. 3, in the speed estimation device 200 for a moving sound source in the second example embodiment, the frequency analysis unit 201 calculates a frequency spectrogram X(k, l) when a sound signal x(t) is input (Step S101).

Then, the estimation unit 203 estimates a movement speed v of a sound source, based on the frequency spectrogram X(k, l) and a frequency spectrogram template Y_v(k, l, f_s) stored in the model storage unit 202 (Step S102).

According to the present example embodiment, a temporal change of a pattern of the sound source frequency f0 of the moving sound source is identified as a change in the entire frequency structure by a frequency spectrogram, and thus deterioration of performance due to disturbance can be suppressed further than that by a method for identifying a temporal change of only a peak frequency as the technique described in NPL 1. Therefore, according to the present example embodiment, a movement speed of a sound source of sound that has an unclear peak frequency can be estimated more accurately.

Example Embodiment 3

Figure 4:
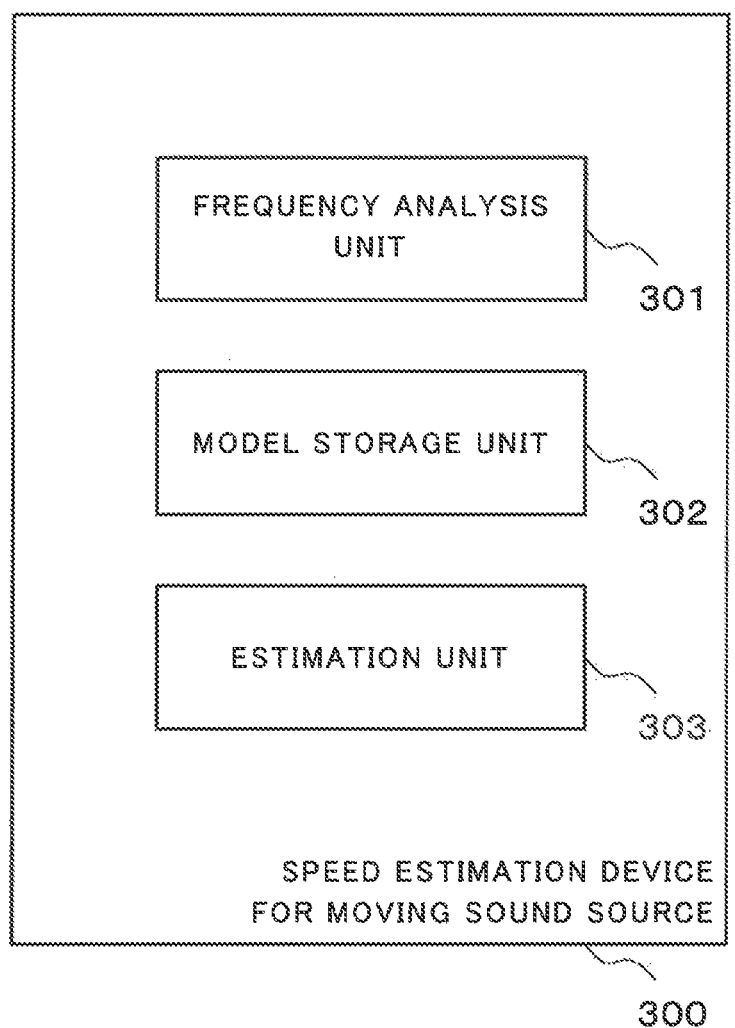
FIG. 4 is a block diagram illustrating a configuration example of a speed estimation device for a moving sound source in a third example embodiment.

A speed estimation device 300 for a moving sound source in a third example embodiment is described with reference to drawings. FIG. 4 is a block diagram illustrating a configuration example of the speed estimation device 300 for a moving sound source in the third example embodiment. The speed estimation device 300 for a moving sound source calculates a movement speed of a sound source, based on a change in an input sound signal, similarly to the speed estimation device 200 for a moving sound source in the second example embodiment. Note that the speed estimation device 300 for a moving sound source is different from the speed estimation device 200 for a moving sound source in the second example embodiment in that a logarithmic frequency spectrogram is used.

As illustrated in FIG. 4, the speed estimation device 300 for a moving sound source in the third example embodiment includes a frequency analysis unit 301, a model storage unit 302, and an estimation unit 303. Note that the frequency analysis unit 301 and the estimation unit 303 are achieved by, for example, a CPU that executes processing according to program control and a plurality of circuits. Further, the model storage unit 302 is achieved by, for example, a storage means such as a hard disk and a memory.

The frequency analysis unit 301 performs a frequency analysis on an input sound signal, and calculates a logarithmic frequency spectrogram. Note that the sound signal is generated by, for example, converting sound input to a microphone (not illustrated) to an electric signal, and is input to the frequency analysis unit 301.

Speed information and logarithmic frequency spectrogram template information are stored in the model storage unit 302. Note that the speed information is, for example, information indicating each of a plurality of movement speeds assumed for a sound source associated with a sound signal input to the speed estimation device 300 for a moving sound source. Specifically, for example, the speed information is information indicating each of speeds (movement speeds) having a value of 0 in the ones place digit among values between 10 km/h to 180 km/h.

Further, the logarithmic frequency spectrogram template information is, for example, information indicating, by a logarithmic frequency spectrogram in a frame according to each movement speed, each temporal change of a frequency pattern of a sound signal observed when a sound source is moved at each movement speed indicated by the speed information. Specifically, the logarithmic frequency spectrogram template information includes, for example, a logarithmic frequency spectrogram in a frame according to 10 km/h and a logarithmic frequency spectrogram in a frame according to 120 km/h.

The estimation unit 303 estimates a movement speed of the sound source, based on the logarithmic frequency spectrogram calculated by the frequency analysis unit 301 and the speed information and the logarithmic frequency spectrogram template information stored in the model storage unit 302.

Each unit is described in more detail.

The frequency analysis unit 301 calculates a logarithmic frequency spectrogram $X(k, l)$ when a sound signal $x(t)$ is input. Herein, t is a variable representing time in the sound signal $x(t)$. In the logarithmic frequency spectrogram $X(k, l)$, k represents the number of frequency bins, and l represents the number of time frames. Then, the logarithmic frequency spectrogram $X(k, l)$ is a k×l matrix in which strength numeric data are an element, the data being about a logarithmic frequency spectrogram with k as the number of frequency bins and l as the number of time frames.

Further, $x(t)$ may be a digital signal obtained by performing A-D conversion on an analog signal obtained by converting input sound to an electric signal by a microphone and the like, for example.

In order to calculate the logarithmic frequency spectrogram $X(k, l)$, the frequency analysis unit 301 may perform processing in a filter bank of a logarithmic frequency after processing of short-time Fourier transformation is performed on $x(t)$, or may perform processing of wavelet transformation or constant-Q wavelet transformation on $x(t)$, for example.

Note that the number l of time frames is, for example, the number of frames within a predetermined time width (for example, within one second before and after a sound source approaches closest to a microphone. It may be longer or shorter than one second.).

The model storage unit 302 stores, as the logarithmic frequency spectrogram template information, a logarithmic frequency spectrogram template $Y\_v(k, l)$ of sound emitted from a sound source moving at a speed v. Specifically, the logarithmic frequency spectrogram template $Y\_v(k, l)$ stored in the model storage unit 302 is, for example, the logarithmic frequency spectrogram template $Y\_v(k, l)$ indicating a change in frequency within a predetermined time width (for example, two seconds. It may be longer or shorter than two seconds.) of sound emitted from a sound source moving at each speed v, taken as a template.

Assuming that a sound speed is c, a movement speed of a sound source is v, and a sound source frequency is f0 herein, a frequency f1 of sound recorded (a recorded frequency) by a microphone and the like is expressed by the equation (1) as described above, based on the Doppler effect.

Then, as described above, a value of the recorded frequency f1 is expressed by a product of the sound source frequency f0 and c/(c−v) in the equation (1). Therefore, as described above, it is clear that a degree of change in the recorded frequency f1 varies depending on a value of the sound source frequency f0. Accordingly, a movement speed of the sound source cannot be estimated accurately.

Thus, a logarithmic frequency is used in the present example. When a logarithmic frequency is used, a relationship between the sound source frequency f0 and the recorded frequency f1 is expressed by an equation (4) indicated below, based on the Doppler effect.

$$\log(f1)=\log(c/(c-v)\times f0) \tag{4}$$

The equation (4) is further expressed as follows.

$$\log(f1)=\log(c)-\log(c-v)+\log(f0) \tag{5}$$

As indicated by the equation (5), a term related to the Doppler effect by the movement of the sound source is only $-\log(c-v)$ that is a second term (division term) related to the moving sound source speed v in the above-described relational expression (equation (5)).

Therefore, a degree of change in a logarithmic value log(f1) of the recorded frequency is determined based on only a degree of change in the speed v without depending on a change in a value of the sound source frequency f0. Thus, the logarithmic frequency spectrogram template $Y\_v(k, l)$ that considers a change in the speed v may be stored in the model storage unit 302. Accordingly, a storage capacity of the model storage unit 302 can be further reduced to be less than that when the logarithmic frequency spectrogram indicating a change in the recorded frequency f1 according to the movement speed v of the sound source is stored for each sound source frequency f0, and a memory cost can be further reduced.

The estimation unit 303 estimates the movement speed v of the sound source, based on the logarithmic frequency spectrogram $X(k, l)$ and the logarithmic frequency spectrogram template $Y\_v(k, l)$. Specifically, the estimation unit 303 first calculates a degree of similarity $Z\_v$ between the logarithmic frequency spectrogram $X(k, l)$ and the logarithmic frequency spectrogram template $Y\_v(k, l)$ by using an equation (4) below.

$$\text{Degree of similarity } Z\_v=\max_n \Sigma_l \Sigma_l \{X(k,l) \times Y\_v(k-n, l)\} \tag{6}$$

Note that the estimation unit 303 determines a value of v as an estimation result of the movement speed v of the sound source when a value of the degree of similarity $Z\_v$ is maximum by changing n from 0 to k. In other words, the estimation unit 303 calculates the degree of similarity $Z\_v$ while shifting a frequency bin, and determines a value of v as an estimation result of the movement speed v of the sound source when a value of the calculation result is maximum.

When the estimation unit 303 calculates a product of $X(k, l)$ and $Y\_v(k-n, l)$ herein, $Y\_v(k-n, l)$ obtained by shifting k being the number of frequency bins of Y_v(k−n, l) by n is used. Accordingly, when a value of n is 0, a frequency bin becomes equal to Y_v(k, l) whose frequency bin is not shifted. When a value of n is 1, a frequency bin is a frequency bin shifted by 1 bin.

Figure 5:
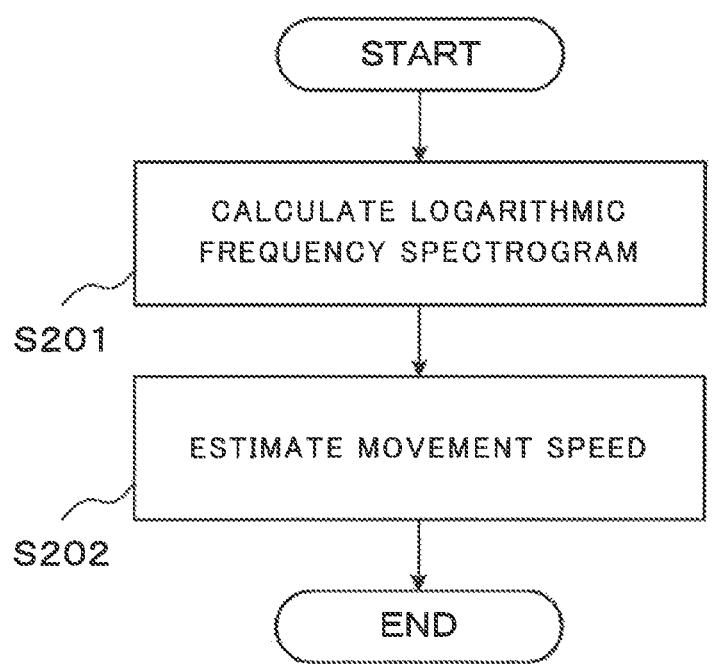
FIG. 5 is a flowchart illustrating an operation of the speed estimation device for a moving sound source in the third example embodiment.

Next, an operation of the speed estimation device 300 for a moving sound source in the third example embodiment is described. FIG. 5 is a flowchart illustrating the operation of the speed estimation device 300 for a moving sound source in the third example embodiment.

As illustrated in FIG. 5, in the speed estimation device 300 for a moving sound source in the third example embodiment, the frequency analysis unit 301 calculates a logarithmic frequency spectrogram X(k, l) when a sound signal x(t) is input (Step S201).

Then, the estimation unit 303 estimates a movement speed v of a sound source, based on the logarithmic frequency spectrogram X(k, l) and a logarithmic frequency spectrogram template Y_v(k, l) stored in the model storage unit 302 (Step S202).

According to the present example embodiment, the estimation unit 303 uses the logarithmic frequency spectrogram X(k, l) for estimating a movement speed of a sound source, and thus a frequency change of sound emitted from a sound source moving at a speed v and recorded can be similarly treated when the sound source frequency f0 is 1000 Hz and 2000 Hz. Further, the estimation unit 303 can treat a change in the sound source frequency f0 as a shift of a frequency bin in the equations (4) and (5). Therefore, in the equation (6) being a calculation equation of the degree of similarity Z_v, the estimation unit 303 shifts a frequency bin by n and performs a computation in such a way as to pick up a maximum value as maxn, and thus estimates a movement speed of a sound source by using a logarithmic frequency spectrogram template Y_v(k, l) in which only the movement speed v of the sound source is taken into consideration regardless of the sound source frequency f0 of the sound source used for calculating X(k, l).

Therefore, according to the present example embodiment, the number of templates stored in the model storage unit 302 can be reduced to be less than that when a state of a change in the recorded frequency f1 according to the movement speed v of the sound source is stored for each sound source frequency f0, and a memory cost can be reduced. Specifically, for example, a cost needed for the model storage unit 302 can be reduced.

Further, in the present example embodiment, the processing of calculating the degree of similarity Z_v between the logarithmic frequency spectrogram X(k, l) and the logarithmic frequency spectrogram template Y_v(k−n, l) while shifting a frequency bin can be increased in speed by performing processing of fast Fourier transform (FFT) on a frequency axis by the estimation unit 303, and can reduce a computation cost to be less than that by another method.

Therefore, according to the present example embodiment, the processing is performed by using a template that does not depend on a frequency of sound emitted from a sound source, based on a logarithmic frequency spectrogram, and thus a memory cost and a computation cost can be reduced. Thus, according to the present example embodiment, a low memory cost and a low computation cost can both be achieved.

According to the present example embodiment, a temporal change of a pattern of the sound source frequency f0 of the moving sound source is identified as a change in the entire frequency structure by a logarithmic frequency spectrogram, and thus deterioration of performance due to disturbance can be suppressed further than that by a method for identifying a temporal change of only a peak frequency as the technique described in NPL 1. Therefore, according to the present example embodiment, a movement speed of a sound source of sound that has an unclear peak frequency can be estimated more accurately, similarly to the second example embodiment.

Example Embodiment 4

Figure 6:
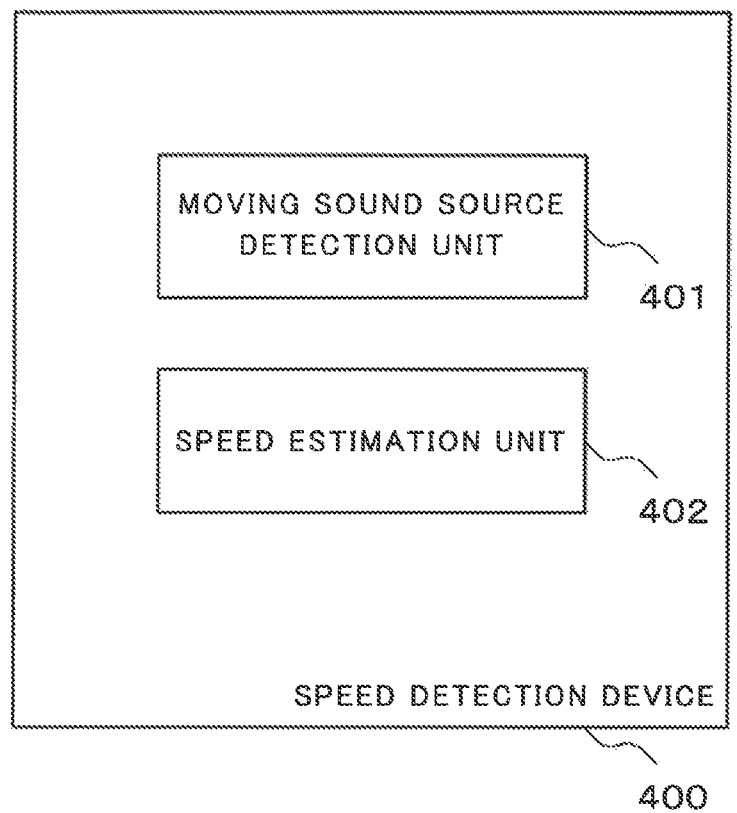
FIG. 6 is a block diagram illustrating a configuration example of a speed detection device in a fourth example embodiment.

Next, a fourth example embodiment is described with reference to drawings. FIG. 6 is a block diagram illustrating a configuration example of a speed detection device 400 in the fourth example embodiment. As illustrated in FIG. 6, the speed detection device 400 in the fourth example embodiment includes a moving sound source detection unit 401 and a speed estimation unit 402.

The speed estimation unit 402 is, for example, the speed estimation device 100 for a moving sound source in the first example embodiment, the speed estimation device 200 for a moving sound source in the second example embodiment, and the speed estimation device 300 for a moving sound source in the third example embodiment.

The moving sound source detection unit 401 detects presence of a moving sound source, based on a sound signal x_o(t), and inputs a moving sound source signal x(t) from which the sound signal x_o(t) in a time period including a signal according to sound emitted from the moving sound source is cut to the speed estimation unit 402. Herein, t is a variable representing time. An example of detection for a moving sound source includes a detection method based on a peak of signal power. Specifically, for example, the moving sound source detection unit 401 inputs a moving sound source signal x(t) from which a sound signal x_o(t) in a time period having a maximum amplitude of the sound signal x_o(t) is picked to the speed estimation unit 402.

In other words, the moving sound source detection unit 401 calculates a time t_o at which an amplitude is maximum in the sound signal x_o(t) cut for each predetermined time width (for example, 5 seconds. It may be shorter or longer than 5 seconds.). The moving sound source detection unit 401 calculates the time t_o by using an equation (7) indicated below, for example.

$$\text{Time } t\_o = \arg\max\_t |x\_o(t)|^2 \quad (7)$$

When a sound source is moving while emitting steady sound, signal power of the sound signal x_o(t) becomes maximum with the sound source near a microphone, i.e., with the sound source approaching closest to the microphone. Further, when the sound source passes closest to the microphone, a recorded frequency is changed most greatly. Therefore, the moving sound source signal x(t) being the sound signal x_o(t) in a time period including the time t_o at which the signal power is maximum is a signal appropriate for estimating a movement speed of a sound source by the speed estimation device 100 for a moving sound source in the first example embodiment, the speed estimation device 200 for a moving sound source in the second example embodiment, and the speed estimation device 300 for a moving sound source in the third example embodiment.

A predetermined time width is described. A predetermined time width is set appropriately according to a sound source to be measured. For example, when the speed of an automobile traveling on an expressway or an automobile-specific road is estimated, it is desirable that the sound signal x_o(t) within about 5 seconds before and after the automobile passes closest to a microphone disposed on a road shoulder is used. Thus, in such a case, 10 seconds are set as a predetermined time width. In addition, for example, two seconds may be set as a predetermined time width in such a way as to include one second before and after the time t_o according to a sound source to be measured.

The speed estimation unit 402 performs processing similar to the processing performed by the speed estimation device 100 for a moving sound source in the first example embodiment or the processing performed by the speed estimation device 200 for a moving sound source in the third example embodiment on the moving sound source signal x(t) input by the moving sound source detection unit 401, estimates a movement speed of the sound source, and outputs an estimation result.

Figure 7:
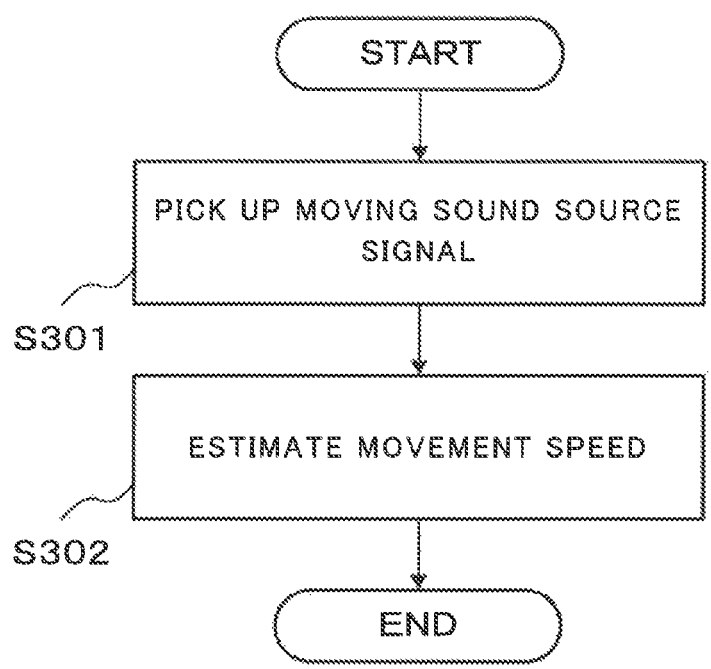
FIG. 7 is a flowchart illustrating an operation of the speed detection device in the fourth example embodiment.

Next, an operation of the speed detection device 400 in the fourth example embodiment is described. FIG. 7 is a flowchart illustrating the operation of the speed detection device 400 in the fourth example embodiment.

As illustrated in FIG. 7, in the speed detection device 400 in the fourth example embodiment, the moving sound source detection unit 401 detects presence of a moving sound source from the sound signal x_o(t), and picks up, from the sound signal x_o(t), a moving sound source signal x(t) being a sound signal in a time period including a signal according to sound emitted from the moving sound source (Step S301). Then, the moving sound source detection unit 401 inputs the picked moving sound source signal x(t) to the speed estimation unit 402.

Then, the speed estimation unit 402 performs processing similar to the processing performed by the speed estimation device 100 for a moving sound source in the first example embodiment, the processing performed by the speed estimation device 200 for a moving sound source in the second example embodiment, or the processing performed by the speed estimation device 300 for a moving sound source in the third example embodiment on the moving sound source signal x(t) input by the moving sound source detection unit 401, estimates a movement speed of the sound source, and outputs an estimation result (Step S302).

According to the present example embodiment, the speed detection device 400 includes the moving sound source detection unit 401 and the speed estimation unit 402, and thus a portion appropriate for estimating a movement speed of a sound source is picked from the sound signal x_o(t), and speed estimation can be performed, in addition to the effect of the first example embodiment, the effect of the second example embodiment, and the effect of the third example embodiment. Therefore, a memory cost and a computation cost can be further reduced.

Example Embodiment 5

Figure 8:
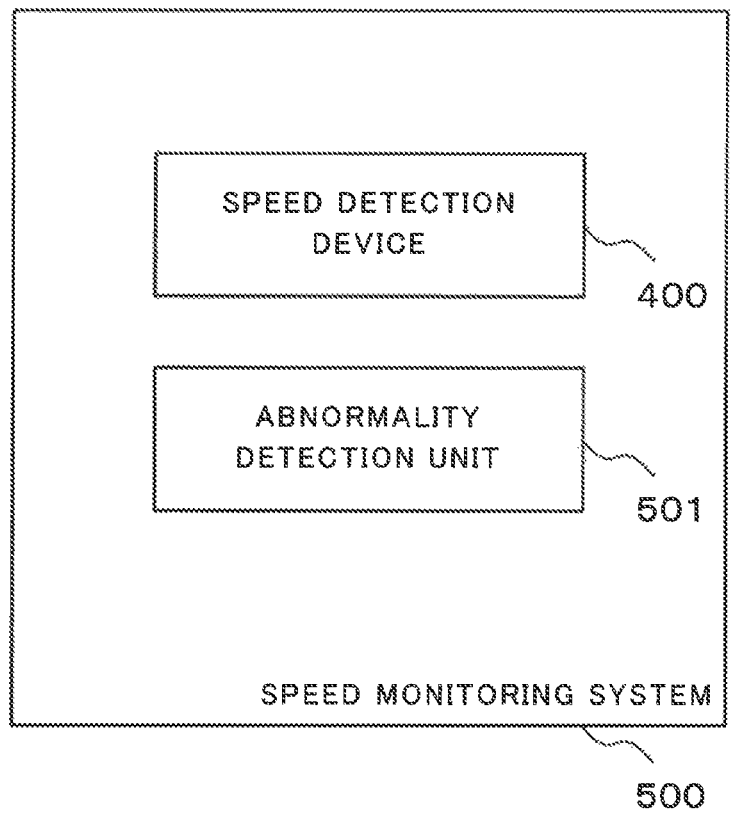
FIG. 8 is a block diagram illustrating a configuration example of a speed monitoring system in a fifth example embodiment.

Next, a fifth example embodiment is described with reference to drawings. FIG. 8 is a block diagram illustrating a configuration example of a speed monitoring system 500 in the fifth example embodiment. As illustrated in FIG. 8, the speed monitoring system 500 in the fifth example embodiment includes a speed detection device 400 and an abnormality detection unit 501.

The speed detection device 400 estimates a movement speed v of a sound source, based on a sound signal being input thereto and emitted from the moving sound source, and inputs an estimation result to the abnormality detection unit 501. Note that it is assumed that the speed detection device 400 is, for example, the speed detection device 400 in the fourth example embodiment. Therefore, the speed detection device 400 can accurately estimate a movement speed of a sound source even when a sound signal that has an unclear peak frequency is input.

The abnormality detection unit 501 detects occurrence of an abnormal situation, based on a value of the movement speed v of the sound source being estimated and input by the speed detection device 400. For example, when a moving sound source is an automobile, the abnormality detection unit 501 outputs information indicating overspeed violation when the movement speed v having a value greater than a value of a designated maximum speed is input. Further, when the movement speed v having a value smaller than a value of a designated minimum speed is input, the abnormality detection unit 501 outputs information indicating that the automobile may be a disabled vehicle. Therefore, an abnormal operation being performed is indicated by the information output by the abnormality detection unit 501. Furthermore, an average value, dispersion, and the like of vehicle speed of an automobile are calculated over a predetermined period, and information indicating that a traveling condition of a road is changed due to a traffic jam and the like when a deviation value of the vehicle speed is detected, based on a calculation result. Note that, when the movement speed v having a value of equal to or less than 20 km/h in a case where a place to be measured by the speed detection device 400 is an ordinary road or having a value of equal to or less than 40 km/h in a case where the place to be measured is an expressway or an automobile-specific road is measured, it may be configured to output information indicating occurrence of a traffic jam.

In other words, the abnormality detection unit 501 outputs information indicating occurrence of an abnormal situation when a value of the movement speed v of the sound source being estimated and input by the speed detection device 400 falls outside a predetermined range.

Figure 9:
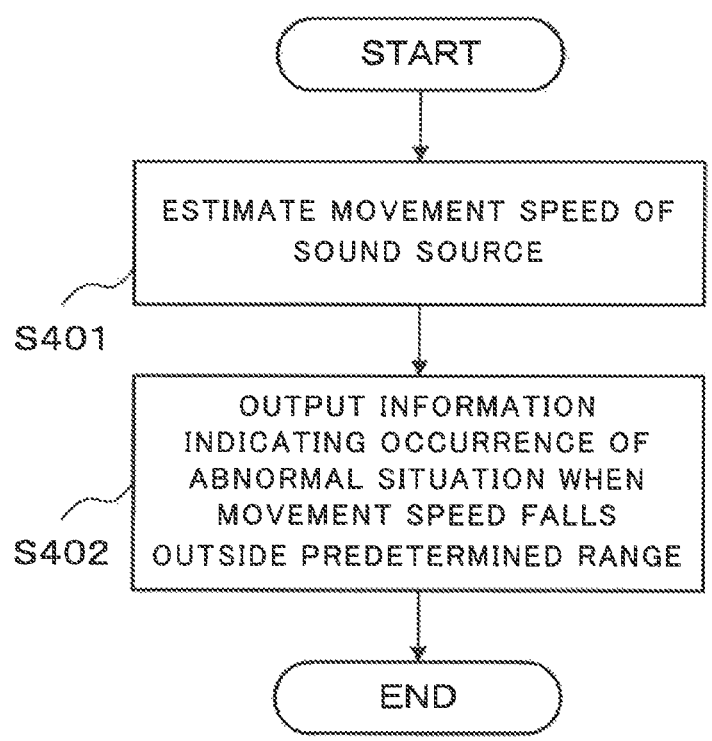
FIG. 9 is a flowchart illustrating an operation of the speed monitoring system in the fifth example embodiment.

Next, an operation of the speed monitoring system 500 in the fifth example embodiment is described. FIG. 9 is a flowchart illustrating the operation of the speed monitoring system 500 in the fifth example embodiment.

As illustrated in FIG. 9, in the speed monitoring system 500 in the fifth example embodiment, the speed detection device 400 estimates a movement speed v of a sound source, based on a sound signal being input and emitted from the moving sound source, and inputs an estimation result to the abnormality detection unit 501 (Step S401).

Then, the abnormality detection unit 501 outputs information indicating occurrence of an abnormal situation when a value of the movement speed v of the sound source being estimated and input by the speed detection device 400 falls outside a predetermined range (Step S402).

According to the present example embodiment, a movement speed of a sound source emitting sound that has an unclear peak frequency or a sound source in an environment with noise at equal to or greater than a predetermined level can be estimated, similarly to the effect of the first example embodiment, the effect of the second example embodiment, the effect of the third example embodiment, and the effect of the fourth example embodiment.

Further, according to the present example embodiment, the abnormality detection unit 501 is further included, and thus occurrence of a traffic jam, an abnormal operation, and the like can be monitored and found based on an estimated movement speed.

Example Embodiment 6

Figure 10:
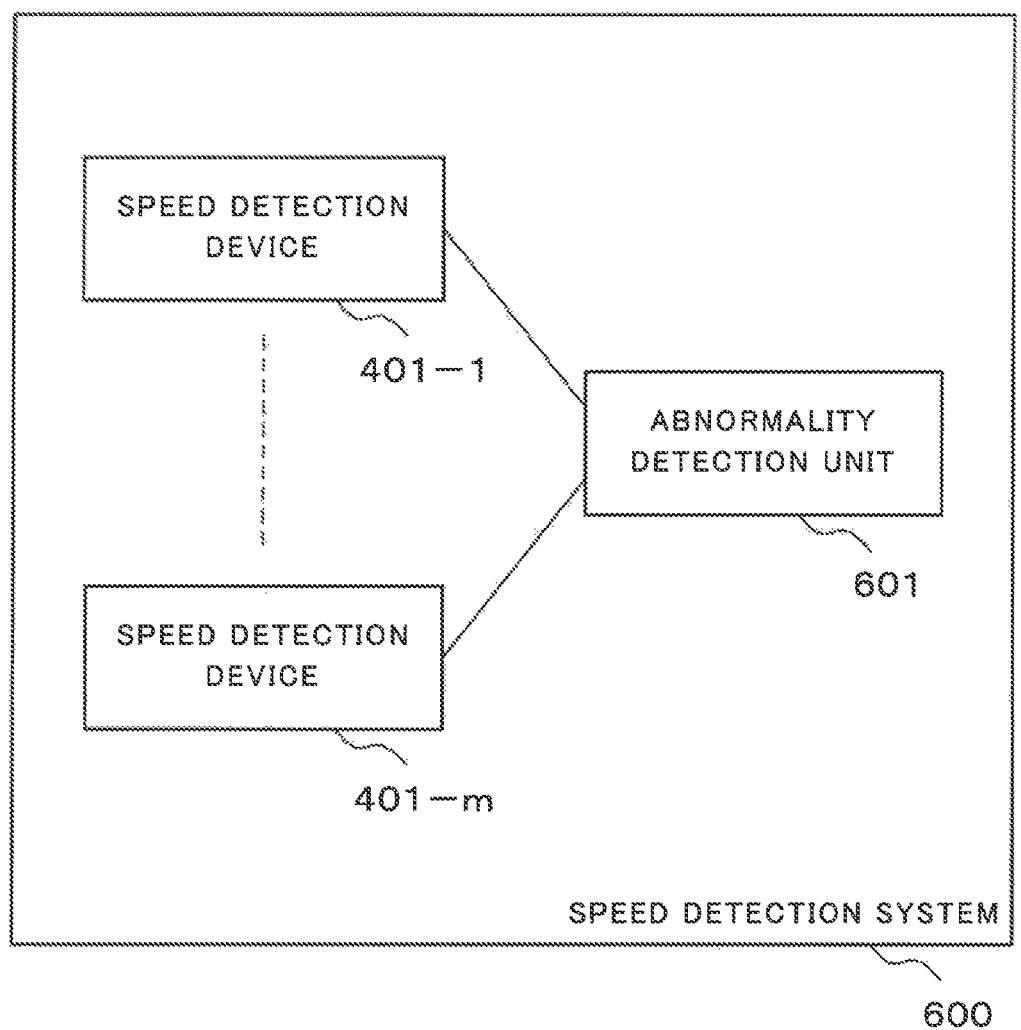
FIG. 10 is a block diagram illustrating a configuration example of a speed detection system in a sixth example embodiment.

Next, a sixth example embodiment is described with reference to drawings. FIG. 10 is a block diagram illustrating a configuration example of a speed detection system 600 in the sixth example embodiment. The speed detection system 600 in the sixth example embodiment measures a movement speed of a sound source at a plurality of locations, and monitors the movement speed of the sound source over a wide area, based on a measurement result.

As illustrated in FIG. 10, the speed detection system 600 in the sixth example embodiment includes speed detection devices 400-1 to 400-$m$ and an abnormality detection unit 601.

The speed detection devices 400-1 to 400-$m$ estimate a movement speed v of a sound source, based on a sound signal being input and emitted from the moving sound source, and inputs an estimation result to the abnormality detection unit 601. Note that it is assumed that each of the speed detection devices 400-1 to 400-$m$ are each, for example, the speed detection device 400 in each of the fourth example embodiment and the fifth example embodiment. Therefore, each of the speed detection devices 400-1 to 400-$m$ can accurately estimate a movement speed of a sound source even when a sound signal that has an unclear peak frequency is input.

The abnormality detection unit 601 detects occurrence of an abnormal situation, based on a value of the movement speed v of the sound source being estimated and input by each of the speed detection devices 400-1 to 400-$m$. Specifically, for example, road information indicating a road system is stored in a storage means (not illustrated) of the abnormality detection unit 601. Further, arrangement information in which the speed detection devices 400-1 to 400-$m$, roads being places to be measured by the speed detection devices 400-1 to 400-$m$, a maximum speed designated for the roads, and a minimum speed, if designated, are associated with one another is stored in the storage means of the abnormality detection unit 601.

Then, the abnormality detection unit 601 outputs information indicating overspeed violation when a value of the movement speed v of the sound source being estimated and input by any of the speed detection devices 400-1 to 400-$m$ is a value greater than a value of a maximum speed of a place to be measured being the input source indicated by the arrangement information.

Further, the abnormality detection unit 601 outputs information indicating that an automobile may be a disabled vehicle when a value of the movement speed v of the sound source being estimated and input by any of the speed detection devices 400-1 to 400-$m$ is a value smaller than a value of a minimum speed of a place to be measured being the input source indicated by the arrangement information.

In other words, the abnormality detection unit 601 outputs information indicating occurrence of an abnormal situation when a value of the movement speed v of the sound source being estimated and input by the speed detection devices 400-1 to 400-$m$ falls outside a predetermined range. Note that, when the abnormality detection unit 601 outputs information indicating occurrence of an abnormal situation, the abnormality detection unit 601 may output information identifying the speed detection devices 400-1 to 400-$m$ that input a value of the movement speed v and may be configured to output information indicating arranged places of the speed detection devices 400-1 to 400-$m$ that input a value of the movement speed v, based on the arrangement information.

Further, the abnormality detection unit 601 outputs information indicating that a traffic jam occurs across places to be measured when a value of the movement speed v being input by any plurality of the speed detection devices 400-1 to 400-$m$ is smaller than a value of a minimum speed of the places to be measured being each input source indicated by the arrangement information and it is indicated that the places to be measured are connected in a series by the road information. Note that, in the present example, the abnormality detection unit 601 calculates an average value, dispersion, and the like of a movement speed (vehicle speed of an automobile in the present example) of a sound source over a predetermined period, and outputs information indicating that a traveling condition of a road is changed due to a traffic jam and the like across places to be measured connected in a series when a deviation value of the vehicle speed is detected at the places to be measured, based on a calculation result. Herein, the "places to be measured connected in a series" represents, for example, places to be measured disposed in such a way as to be successively passed by a vehicle such as an automobile when the vehicle travels by following a road.

Note that, assuming that a deviation value of the vehicle speed is detected when a movement speed v having a value of equal to or less than 20 km/h on an ordinary road or a value of equal to or less than 40 km/h on an expressway or an automobile-specific road is measured at the places to be measured connected in a series, information indicating that a traveling condition of a road is changed due to a traffic jam and the like across places to be measured is output.

Figure 11:
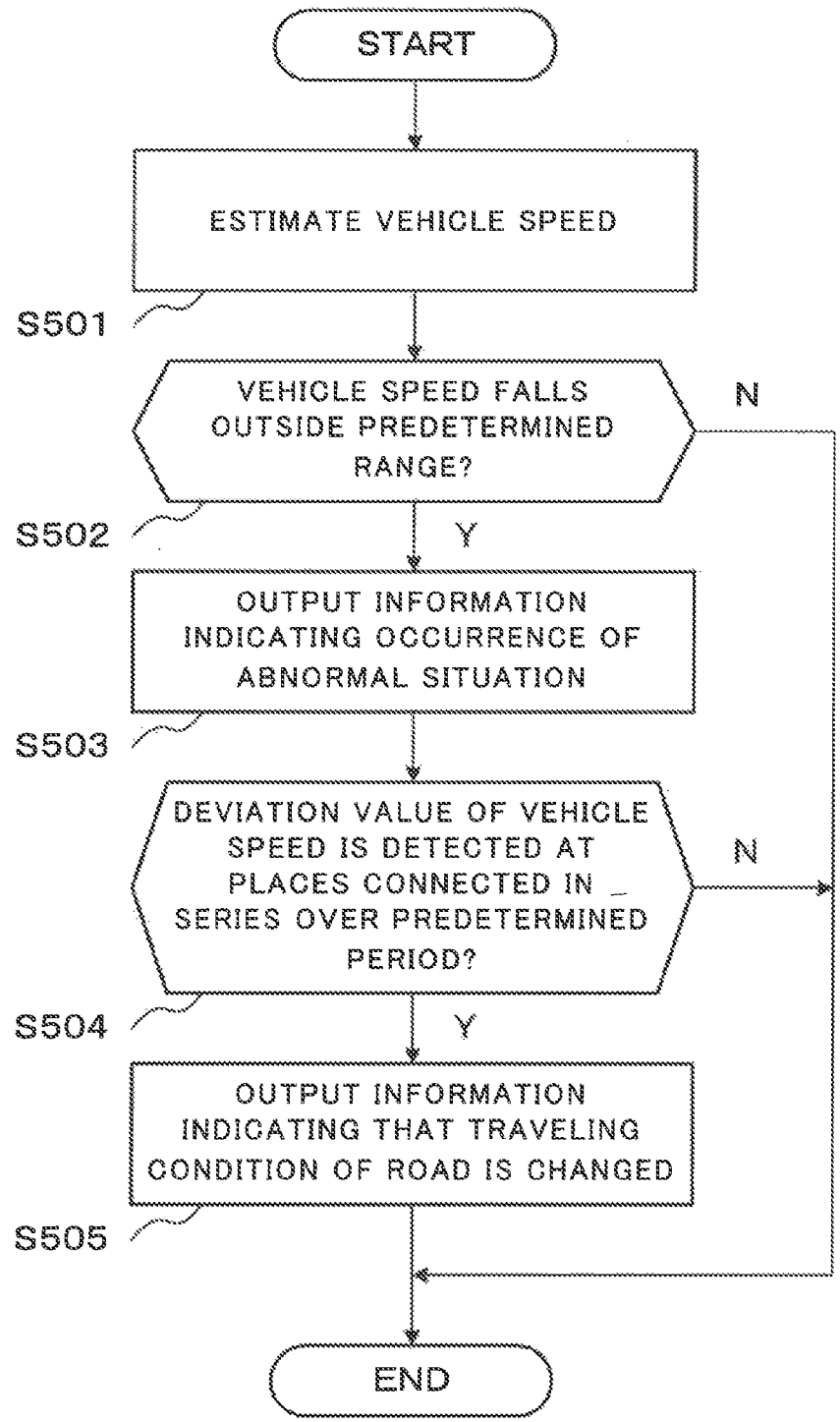
FIG. 11 is a flowchart illustrating an operation of the speed detection system in the sixth example embodiment.

Next, an operation of the speed detection system 600 in the sixth example embodiment is described. FIG. 11 is a flowchart illustrating the operation of the speed detection system 600 in the sixth example embodiment.

As illustrated in FIG. 11, in the speed detection system 600 in the sixth example embodiment, the speed detection devices 400-1 to 400-$m$ estimate a movement speed v (vehicle speed in the present example) of a sound source, based on a sound signal being input and emitted from the moving sound source (automobile in the present example) (Step S501), and inputs an estimation result to the abnormality detection unit 601.

Then, when a value of the movement speed v of the sound source being input falls outside a predetermined range (Y in Step S502), the abnormality detection unit 601 outputs information indicating occurrence of an abnormal situation (Step S503).

Furthermore, when a deviation value of the vehicle speed is detected at the places to be measured connected in a series over a predetermined period (Y in Step S504), the abnormality detection unit 601 outputs information indicating that a traveling condition of a road is changed due to a traffic jam and the like across the places to be measured (Step S505).

According to the present example embodiment, occurrence of a traffic jam, an abnormal operation, and the like can be monitored and found over a wide area, in addition to the effect of the fifth example embodiment.

Although the claimed invention has been described above with reference to the example embodiments, it should be understood that the claimed invention is not limited to the above-described example embodiments.

Various modifications that can be understood by those skilled in the art within the scope of the claimed invention may be made to the configuration and the details of the claimed invention. Further, a system or a device that combines different features included in each example embodiment in any form is also included within the scope of the claimed invention.

Further, the claimed invention may be applied to a system including a plurality of apparatuses and may be applied to a single device. Furthermore, the claimed invention is also applicable to a case where an information processing program actualizing functions of the example embodiments is supplied to a system or a device directly or remotely. Therefore, in order to achieve functions of the claimed invention by a computer, a program installed in the computer, a medium that stores the program, or a World Wide Web (WWW) server that causes the program to be downloaded is also included within the scope of the claimed invention. In particular, at least, a non-transitory computer readable medium that stores a program causing a computer to execute processing steps included in the above-mentioned example embodiments is included within the scope of the claimed invention.

This application is based upon and claims the benefit of priority from Japanese patent application No. 2016-176167, filed on Sep. 9, 2016, the disclosure of which is incorporated herein in its entirety by reference.

REFERENCE SIGNS LIST 100, 200, 300 Estimation speed device for moving sound source
101, 201, 301 Frequency analysis unit
102, 202, 302 Model storage unit
103, 203, 303 Estimation unit
400 Speed detection device
401 Moving sound source detection unit
402 Speed estimation unit
500 Speed monitoring system
501, 601 Abnormality detection unit
600 Speed detection system

What is claimed is:

1. A speed estimation device for a moving sound source, comprising:
   a model storage unit configured to store spectrogram template information indicating a spectrogram at least according to each of a plurality of predetermined movement speeds, the spectrogram being in a case where a sound source is moved;
   a frequency analysis unit configured to receive an input of a sound signal according to sound emitted from the sound source, to perform a frequency analysis on the sound signal, and to generate a spectrogram; and
   an estimation unit configured to estimate a movement speed of the sound source, based on the plurality of spectrograms indicated by the spectrogram template information stored in the model storage unit, and the spectrogram generated by the frequency analysis unit.

2. The speed estimation device for a moving sound source according to claim 1, wherein
   each of the plurality of spectrograms indicated by the spectrogram template information stored in the model storage unit and the spectrogram generated by the frequency analysis unit are a logarithmic spectrogram.

3. The speed estimation device for a moving sound source according to claim 1, wherein the estimation unit
   calculates a degree of similarity between the spectrogram generated by the frequency analysis unit and each of the plurality of spectrograms indicated by the spectrogram template information stored in the model storage unit, and
   estimates that a movement speed according to a spectrogram having a highest degree of similarity to the spectrogram generated by the frequency analysis unit among the plurality of spectrograms is a movement speed of the sound source.

4. The speed estimation device for a moving sound source according to claim 1, further comprising
   a sound signal picking unit configured to pick, from the sound signal being input, a sound signal according to sound emitted from the moving sound source, and to input the sound signal to the frequency analysis unit.

5. The speed estimation device for a moving sound source according to claim 1, further comprising
   an abnormality detection unit configured to output information indicating occurrence of an abnormal situation when a value of a movement speed of an estimation result by the estimation unit falls outside a predetermined range.

6. A speed monitoring system comprising:
   a plurality of the speed estimation devices for a moving sound source according to claim 1; and
   an abnormality detection unit configured to output information indicating occurrence of an abnormal situation when a value of a movement speed of an estimation result by the estimation unit falls outside a predetermined range.

7. The speed monitoring system according to claim 6, further comprising
   an information storage unit configured to store arrangement information indicating a place to be measured by each of the plurality of the speed estimation devices for a moving sound source, and road information indicating a road network, wherein
   the abnormality detection unit outputs the information indicating occurrence of an abnormal situation over a wide area when a value of a movement speed of an estimation result by the estimation unit in any of the plurality of speed estimation devices for a moving sound source falls outside a predetermined range, and the road information indicates that places to be measured by the any of the plurality of speed estimation devices for a moving sound source indicated by the arrangement information are connected in a series by the road network.

8. A speed estimation method for a moving sound source comprising:
   receiving an input of a sound signal according to sound emitted from a sound source, performing a frequency analysis on the sound signal, and generating a spectrogram; and
   estimating a movement speed of the sound source that emits sound according to the sound signal being input, based on a plurality of spectrograms at least according to each of a plurality of predetermined movement speeds, and a generated spectrogram, the spectrogram being in a case where the sound source is moved.

* * * * *